United States Patent [19]
Allgaier

[11] Patent Number: 5,788,903
[45] Date of Patent: Aug. 4, 1998

[54] METHOD FOR PROVIDING A SELF ALIGNING DIE GUIDE PIN AND BUSHING

[75] Inventor: Wayne Frank Allgaier, Shelby Township, Mich.

[73] Assignee: General Motors Corporation, Detroit, Mich.

[21] Appl. No.: 762,078

[22] Filed: Dec. 9, 1996

[51] Int. Cl.⁶ .................. B32B 31/06; B29C 33/40; F16C 29/02
[52] U.S. Cl. .................. 264/219; 264/242; 264/262; 264/263; 384/29
[58] Field of Search .................. 384/30, 29, 41, 384/295; 264/242, 264, 262, 219, 263

[56] References Cited

U.S. PATENT DOCUMENTS

| | | | |
|---|---|---|---|
| 3,582,158 | 6/1971 | Hammon | 308/4 C |
| 3,871,226 | 3/1975 | Janiszewski | 72/456 |
| 4,104,941 | 8/1978 | Krueger | 83/133 |
| 4,386,868 | 6/1983 | Bluver et al. | 403/24 |
| 4,750,876 | 6/1988 | Lawson | 425/406 |
| 4,869,603 | 9/1989 | Melzer et al. | 384/255 |
| 5,213,000 | 5/1993 | Saya et al. | 74/425 |
| 5,490,317 | 2/1996 | Kubert | 29/564.7 |

*Primary Examiner*—Jan H. Silbaugh
*Assistant Examiner*—Suzanne E. Mason
*Attorney, Agent, or Firm*—Patrick M. Griffin

[57] ABSTRACT

A self aligning die guide pin bushing incorporates inner and outer sleeves that are axially locked together, but which can shift radially relative to one another sufficiently to accommodated an eccentricity between the guide pin and the bore in which the bushing is mounted. The outer sleeve of the bushing is mounted to the bore conventionally, and is removable. After the outer sleeve is mounted, the other die is moved so as to push the guide pin through the inner sleeve, thereby forcing the inner sleeve into alignment with the guide pin. Then, an epoxy layer is injected into the spaced between sleeves to fix the inner sleeve in alignment with the guide pin.

3 Claims, 4 Drawing Sheets

METHOD FOR PROVIDING A SELF ALIGNING DIE GUIDE PIN AND BUSHING

TECHNICAL FIELD

This invention relates to die guide pins and bushings in general, and specifically to a means for providing a self aligning bushing to receive a guide pin.

BACKGROUND OF THE INVENTION

Stamping dies that move together and apart to form, cut or punch a sheet metal part generally contain perpendicular guide pins on one die that slide axially into close fitting, sleeve shaped bushings mounted through the other die. The axial entrance of guide pins within close fitting bushings with every cycle keeps the dies aligned and resists side forces resulting from the stamping or punching operations. The difficulty, of course, is in getting the guide pins and their bushings properly aligned with one another initially, when the dies and press are set up, so that they can successfully perform the function of keeping the dies aligned in operation.

Current common commercial practice simply involves reworking and redrilling the bores that contain the bushings. That is, if a guide pin does not fit a particular bushing, the bore containing that bushing has to be reconfigured and realigned somehow. That can involve filling and redrilling the misaligned bore. Or, the bore may be drilled out again at a larger diameter, but correctly aligned, and then larger diameter bushing installed into the new, larger bore. Or, in the case of severe misalignment, both the bushing bore and the hole in the other die that mounts the guide pin may be drilled out at a larger diameter, and both a new, larger bushing and new, larger pin installed. Once a properly aligned bushing bore has been achieved, the bushings are generally installed with threaded clamps or the equivalent so that, after repeated use and wear, they can be easily replaced. However, an essentially permanent bushing installation technique is also sometimes used to compensate for initial bore-pin misalignment. With this method, the bore is simply drilled out larger than the outer diameter of its bushing in the first place, with no attempt to initially accurately align the oversized bore with the guide pin. Then, an undersized bushing is slipped over the pin, and inserted, while the pin holds it, into the oversized and non concentric bushing. Then, a material like epoxy is used to fill the eccentric radial clearance left between the bushing and its oversized bore. The great drawback here is that a one piece bushing epoxied into an oversized bore in effect becomes a permanent part of the die, and cannot be easily replaced after it or the pin have worn with repeated use. It would basically have to be drilled out, and the process begun all over again with an even larger diameter bore and thicker bushing. All of these bushing installation and replacement methods are time consuming and very costly, and none provides a simple, automatic means for initially aligning a guide pin and a replaceable, conventionally installed bushing.

Several issued patents recognize the misalignment problem, but they tend to deal with the symptoms of, and not the root cause of, the problem. For example, U.S. Pat. No. 3,871,226 issued Mar. 18, 1975 to Janiszewski provides a bushing actually designed to break and pull out of the bore in the event of misalignment. There would still have to be considerable rework to get a new, aligned bushing re installed. Likewise, U.S. Pat. No. 3,871,226 provides a guide pin and bushing that are threadably attached to the dies, so as to allow for easier replacement of worn or misaligned bushings or pins. However, no automatic alignment means is provided. U.S. Pat. No. 4,386,868, issued Jun. 7, 1983 to Bluver et al. discloses a bushing with a relatively long, tapered lead in throat to catch and funnel in a guide pin, which also has a matching conical section. However, at some point, a cylindrical body of the guide pin has to slide into a close fitting, cylindrical inner surface of the bushing. If they are misaligned, there will be sideways force on the pin, in spite of a conical lead in. Non cylindrical guide pins are known, as well. U.S. Pat. No. 4,750,876, issued Jun. 14, 1988 to Lawson shows a multi piece square guide pin and bushing, in which the bushing rides on preloaded ball bearings in order to compensate for differential temperature expansion of a pair of hot mold presses. That is a unique environment, however, and such a square design would not be practical, as compared to simply drilling cylindrical bushing and guide pin bores.

Various complex alignment mechanisms do exist for automatically aligning large die platens or templates with other features on the die, such as punches. The platens are designed to be able to shift horizontally, on rails or by some other sort of floating attachment. Upper guide pins with conical lead in surfaces at the end are aligned just sufficiently with lower bushings to enter the bushings as the dies close, and thereby shift the slideable patens into alignment. Examples are shown in U.S. Pat. No. 5,490,317, issued Feb. 13, 1996 to Kubert and U.S. Pat. No. 4,104,941, issued Aug. 8, 1978 to Krueger. Such designs are not applicable to a typical pair of dies, however, each of which is fixed relative to the other in the horizontal direction. It is not feasible to allow an entire die to shift horizontally relative to the other in order to allow the pin and bushing to re align every time the dies close, since it is the pins and bushing which must align the die, not vice versa.

SUMMARY OF THE INVENTION

The invention provides a method for effectively and simply aligning a guide pin and bushing initially, when the dies are set up, with no re drilling. No oversized bushing or guide pin bores are needed. The guide pin is totally conventional, but the bushing is a special, two piece floating design that fits within and is mounted to a normally sized bushing hole by conventional, easily replaceable, clamps.

In the preferred embodiment of the method disclosed, a normal sized bushing bore is provided in one die, but it need not be perfectly aligned with a guide pin as drilled, as is conventional. Instead, the bore is aligned only within a predetermined radial alignment tolerance, a tolerance well within normal manufacturing capability. There is also sufficient radial clearance between the bushing and the guide pin to receive a bushing.

The bushing includes an outer sleeve that has an outer diameter that fits closely within the inner surface of the bushing, just as a normal one piece bushing would fit, and is fixed to the die with conventional clamps. An inner bushing sleeve has an inner diameter that closely slidably receives the guide pin, and an outer diameter that has a radial clearance relative to the inner diameter of the outer sleeve. This bushing internal radial clearance is at least equal to the predetermined radial alignment tolerance between the axes of the guide pin and the bushing bore. Interengaging, oppositely axially facing twist lock teeth and abutting annular stop flanges on the outer and inner sleeves abut with one another so as to prevent the two sleeve from shifting axially relative to each other in either direction. However, the axially abutted stop surfaces on both sleeves are deliberately not so strongly abutted as to prevent relative radial shifting between the sleeves. In addition, in the embodiment disclosed, the inner sleeve also has a small injection port that opens into the internal radial clearance of the bushing.

After the guide pin and roughly aligned bushing bore are mounted and drilled, the outer sleeve of the two piece bushing is inserted into the bushing bore and fixed to the die as a normal, one piece bushing would be, with threaded, easily replaced clamps. Then, the other die member is closed sufficiently to cause the guide pin to enter the inner bushing sleeve. There is enough conical lead in on both the edge of the inner sleeve and the end of the guide pin to start the pin into the inner sleeve, despite any misalignment therebetween. Since the inner sleeve can radially shift within and relative to the outer sleeve, it is automatically forced into alignment with the guide pin axis, even if the outer sleeve is misaligned. With the dies remaining partially closed, so that the guide pin remains within the bushing inner sleeve to keep it aligned with the pin, a liquid, hardenable material is injected through the port and into the radial clearance between inner and outer sleeves. After it hardens, the dies can be parted. The inner sleeve will remain accurately aligned with the guide pin thereafter, even if the radial clearance between inner and outer sleeve is eccentric.

BRIEF DESCRIPTION OF THE DRAWINGS

These and other features of the invention will appear from the following written description, and from the drawings, in which.

DESCRIPTION OF THE PREFERRED EMBODIMENT

Figure 1:
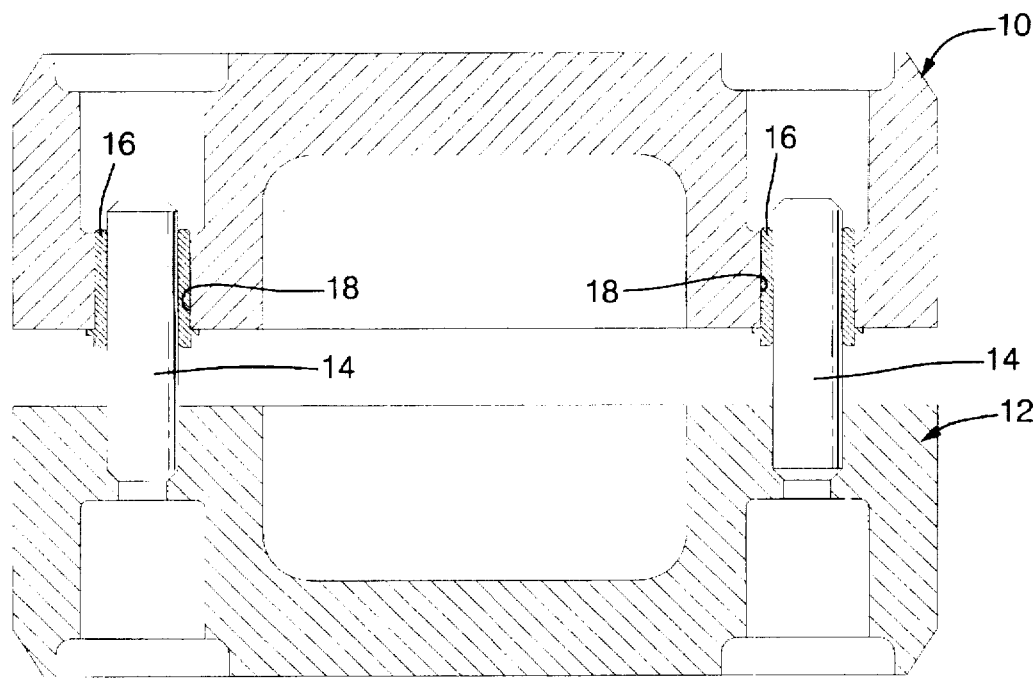
FIG. 1 is a schematic representation of a set of dies incorporating a prior art, one piece bushing.
Figure 6:
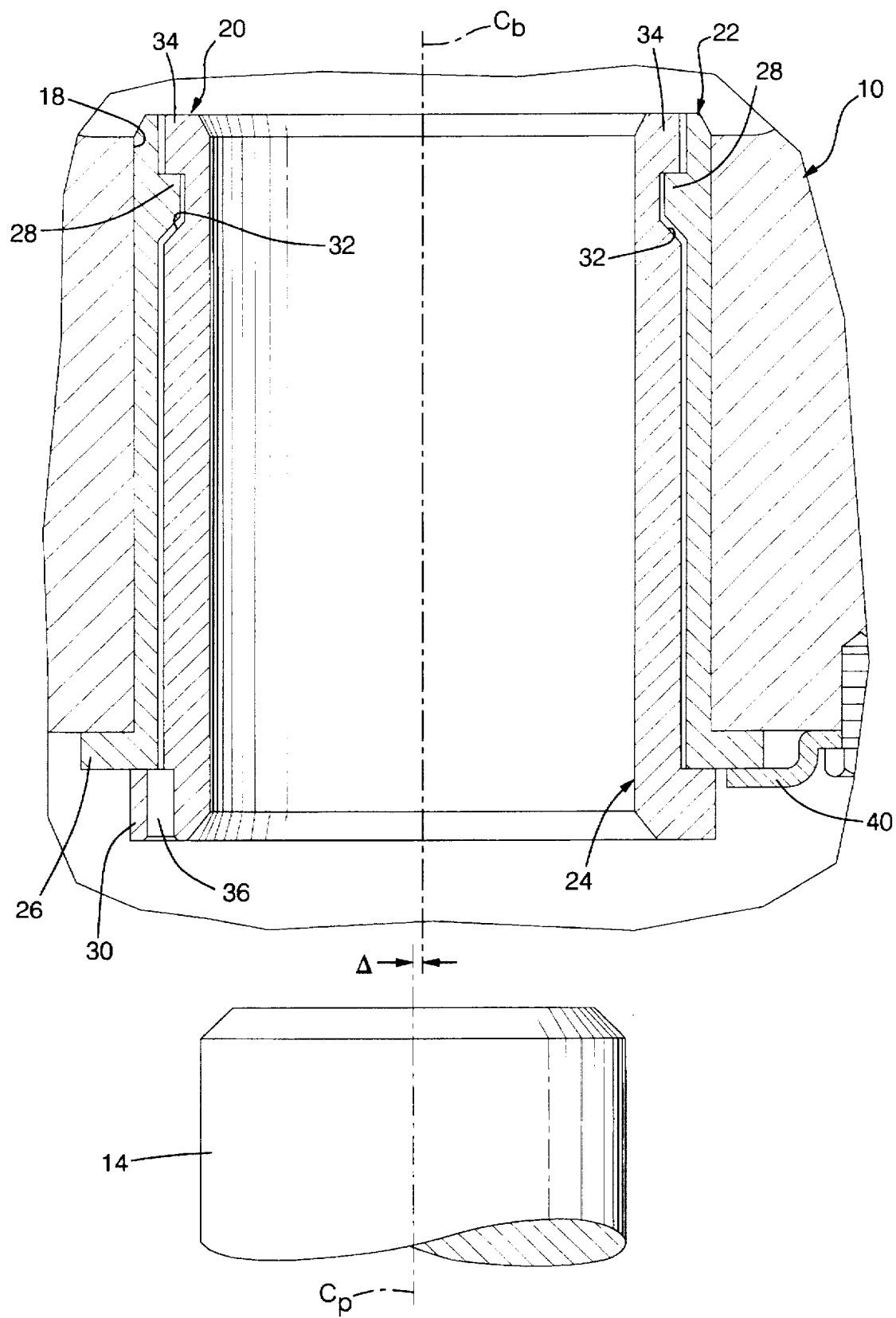
FIG. 6 is a cross sectional view of the bushing after it has been installed in the bushing bore, but before the guide pin has entered the inner sleeve.

Referring first to FIGS. 1 and 6, the basic environment in which the invention is used is illustrated. As seen in FIG. 1 schematic view, an upper die 10 and lower die 12 close together and move apart in order to stamp, punch, or otherwise form a non illustrated workpiece therebetween. At least two, and generally four, cylindrical guide pins 14 fixed perpendicular to the lower die 12 move parallel to the direction of die closure, entering matching solid bushings 16 mounted in close fitting bores 18 in upper die 10. This serves to keep the dies 10 and 12 aligned. The bushings 16, of course, must be initially aligned with the guide pins 14 in order to work. As best seen in FIG. 6, a preferred embodiment of the bushing of the invention, indicated generally at 20, is used with the same basic dies, guide pins and bores, all of which are given the same number. However, unlike the solid bushing 16, the bore 18 and guide pin 14 need not initially have absolute concentricity. Instead, the bore 18 can be drilled so that its centerline Cb and the centerline of the pin Cp have a misalignment limited to a predetermined amount Δ, which is within easily achieved manufacturing tolerances. Here, Δ is approximately 1 mm. In addition, in the embodiment disclosed, the outer diameter of pin 14 is 100 mm, and the inner diameter of bore 18 is 125 mm, leaving a 25 mm potential radial clearance between the two to accommodate a bushing.

Figure 2:
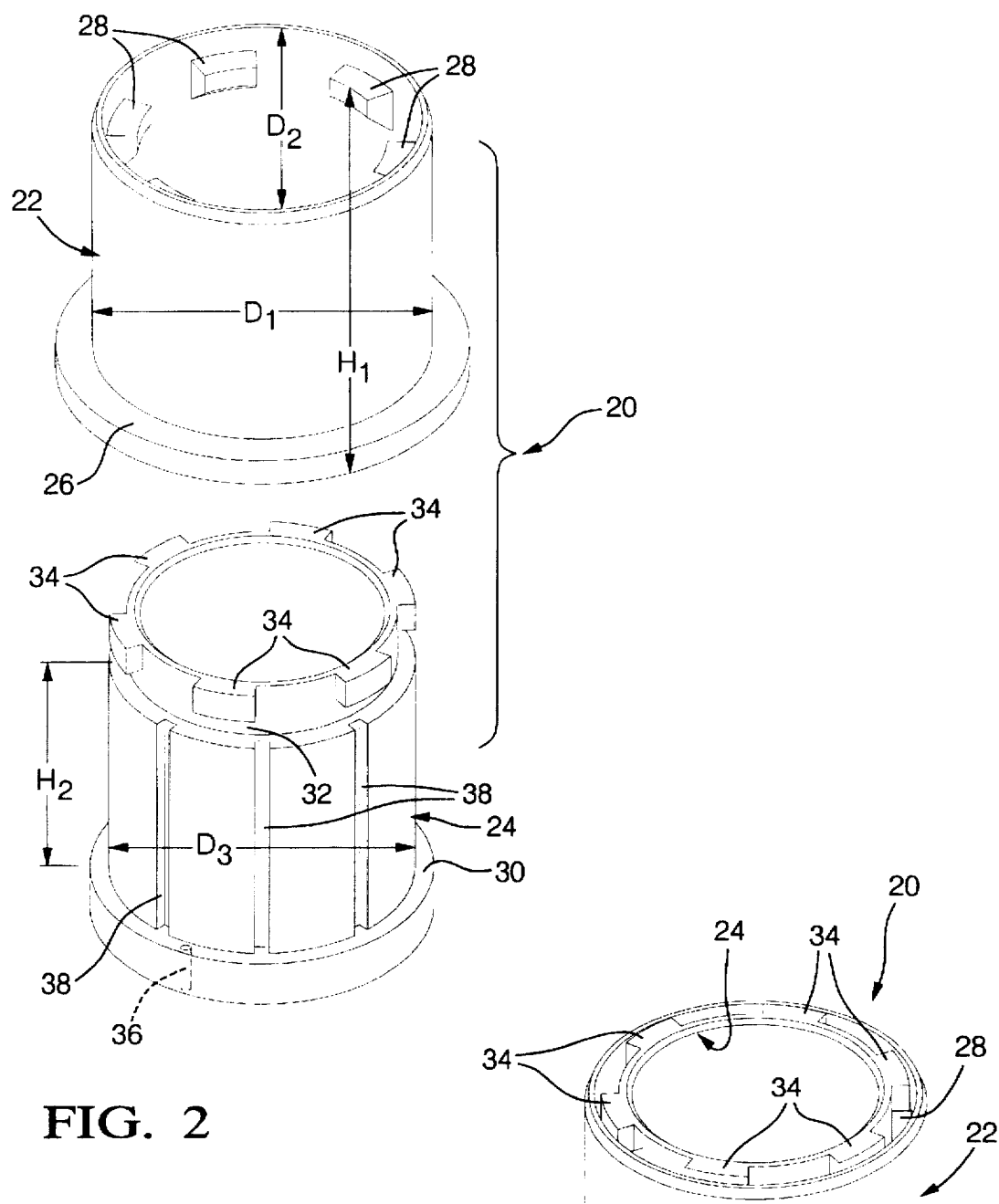
FIG. 2 is a perspective view of both sleeves of the bushing before assembly.

Referring next to FIG. 2 bushing 20 has two components, an outer sleeve 22 and inner sleeve 24, each of which is rough cast and then final machined from bronze or other material that is suitably durable. Outer sleeve 22 is basically a hollow cylinder, with an outer diameter D1 that just matches the inner diameter of the bore 18. Outer sleeve 22 has an inner diameter D2 of 117 mm, which is not significant in absolute terms, but is in terms of its relation to a corresponding diameter of inner sleeve 24, described below. Outer sleeve 22 departs from a simple, constant diameter sleeve in only two significant respects. At the lower end, an annular stop flange 26 protrudes beyond the outer diameter D1 by approximately 15 mm, and is about 6 mm thick axially. On the inner surface, a series of six evenly spaced arcuate teeth 28, each about 30 degrees in arc length and 8 mm thick axially, protrude about 8 mm radially inwardly. The axially outwardly directed upper surfaces of the outer sleeve's teeth 28 sit at an axial height H1 of 102 mm above the axially inwardly directed lower surface of the stop flange 26, and also about 10 mm below the upper end of outer sleeve 22. Inner sleeve 24 is also a basic hollow cylinder, with an outer diameter D3 of 116 mm which, like the inner diameter D2 of outer sleeve 22, is significant not it absolute terms, but because it is 1 mm less than D2. This creates a potential radial clearance between the outer and inner sleeves 22 and 24 of 1 mm, which is significant in that it is at least equal to the pin 14-bore 18 misalignment tolerance, Δ. Like outer sleeve 22, inner sleeve 24 departs from a simple sleeve in a few respects. It also has an annular stop flange 30 at the lower end, which protrudes past the outer diameter D3 by about 9 mm, and is about 13 mm thick axially. An 8 mm axially thick relief notch 32 is cut into the outer surface just below a series of six evenly spaced arcuate teeth 34. The inner sleeve teeth 34 are also about 30 degrees in arc length, but are about 10 mm thick and their top surfaces are flush to the top of inner sleeve 24. The ends of the inner sleeve teeth 34 also protrude about 8 mm past the surface of the notch 32, but are generally flush with the inner sleeve outer diameter D3. The axially inwardly directed lower surfaces of the teeth 34 sit at an axial height H2 of 102 mm above the axially outwardly directed upper surface of the stop flange 30, the same as H1 for the outer sleeve 22. Stop flange 30 also has a small port 36 cut through it, opening near the corner juncture with the outer surface of inner sleeve 24. Finally, if desired, a series of axial flutes 38 may be cut into the outer surface of inner sleeve 24, for a purpose described below.

Figure 4:
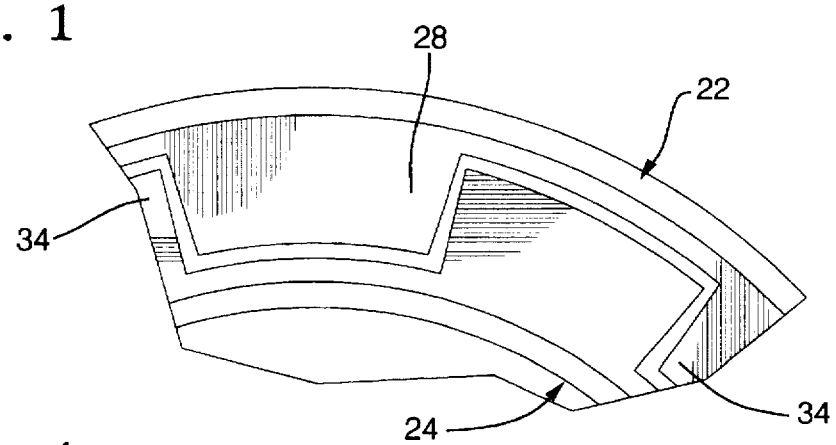
FIG. 4 is an end view showing the teeth of the two sleeves before interlocking.
Figure 5:
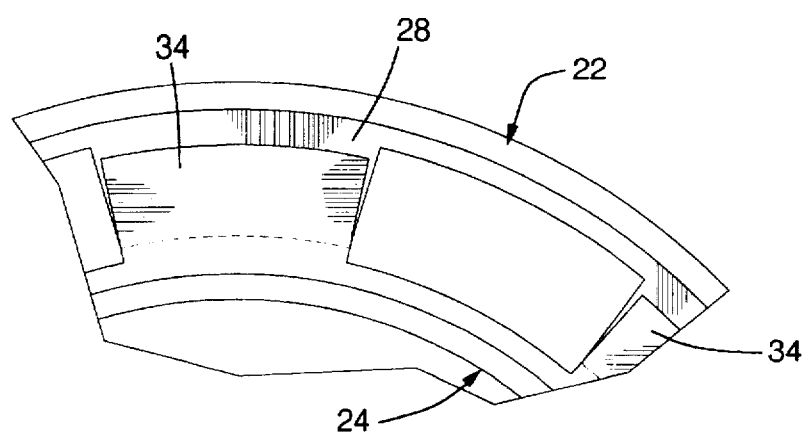
FIG. 5 is a view like 4 after the teeth have been twisted into interlocking engagement.
Figure 3:
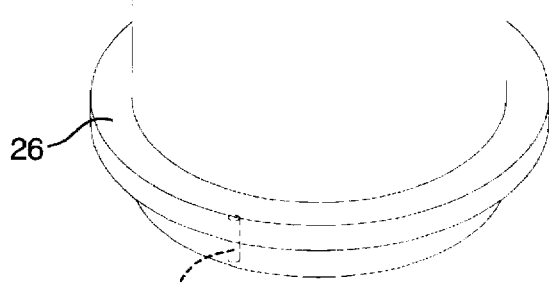
FIG. 3 is a perspective view of the bushing with both sleeves assembled together.

Referring next to FIGS. 3, 4 and 5, the two sleeves 22 and 24 are assembled by inserting the inner sleeve 24 upwardly into outer sleeve 22, with the respective teeth 28 and 34 out of alignment, as best seen in FIG. 4. Eventually, the upper surface of the inner sleeve stop flange 30 abuts with the oppositely axially directed lower surface of the outer sleeve stop flange 26, which prevents the sleeves 22 and 24 from shifting any further axially together. Then, the two sleeves 22 and 24 are turned relatively until the upper surfaces of the outer sleeve teeth 28 turn snugly underneath the oppositely axially directed lower surfaces of the inner sleeve teeth 34, and into the notch 32, because H1 is equal to H2. This prevents the sleeves 22 and 24 from pulling axially apart. Thus, the abutment of the two stop flanges 26 and 30 at the bottom, and the abutment of the teeth 28 and 34 near the top, together prevent any relative axial movement of the sleeves 22 and 24, either together or apart. However, given the relative diameters D2 and D3 described above, there is a total potential internal radial clearance of 1 mm between the two sleeves 22 and 24. That internal radial clearance holds everywhere that the inner surfaces of the outer sleeve 22 and the outer surfaces of the inner sleeve 24 are radially opposed to one another, including the ends of the respective teeth 28 and 34. The twist lock capture of the outer sleeve teeth 28 underneath the inner sleeve teeth 34 is not so tight as to prevent radial shifting therebetween, however, or relative twisting. However, in ordinary handling before installation, and in ordinary use after installation, the two sleeves 22 and 24 are never subjected to enough relative twisting to move the teeth 28 and 34 back out of overlapping engagement. In the completed bushing 20, the overall radial thickness (the differential between D1 and the inner diameter of inner sleeve 24) is approximately 25 mm, the same as the radial clearance between the guide pin 14 and the empty bushing bore 18. In the completed bushing 20, it will also be noted that the lower sleeve stop flange 26 protrudes significantly radially beyond the abutted inner sleeve stop flange 30, by about 15 mm.

Figure 7:
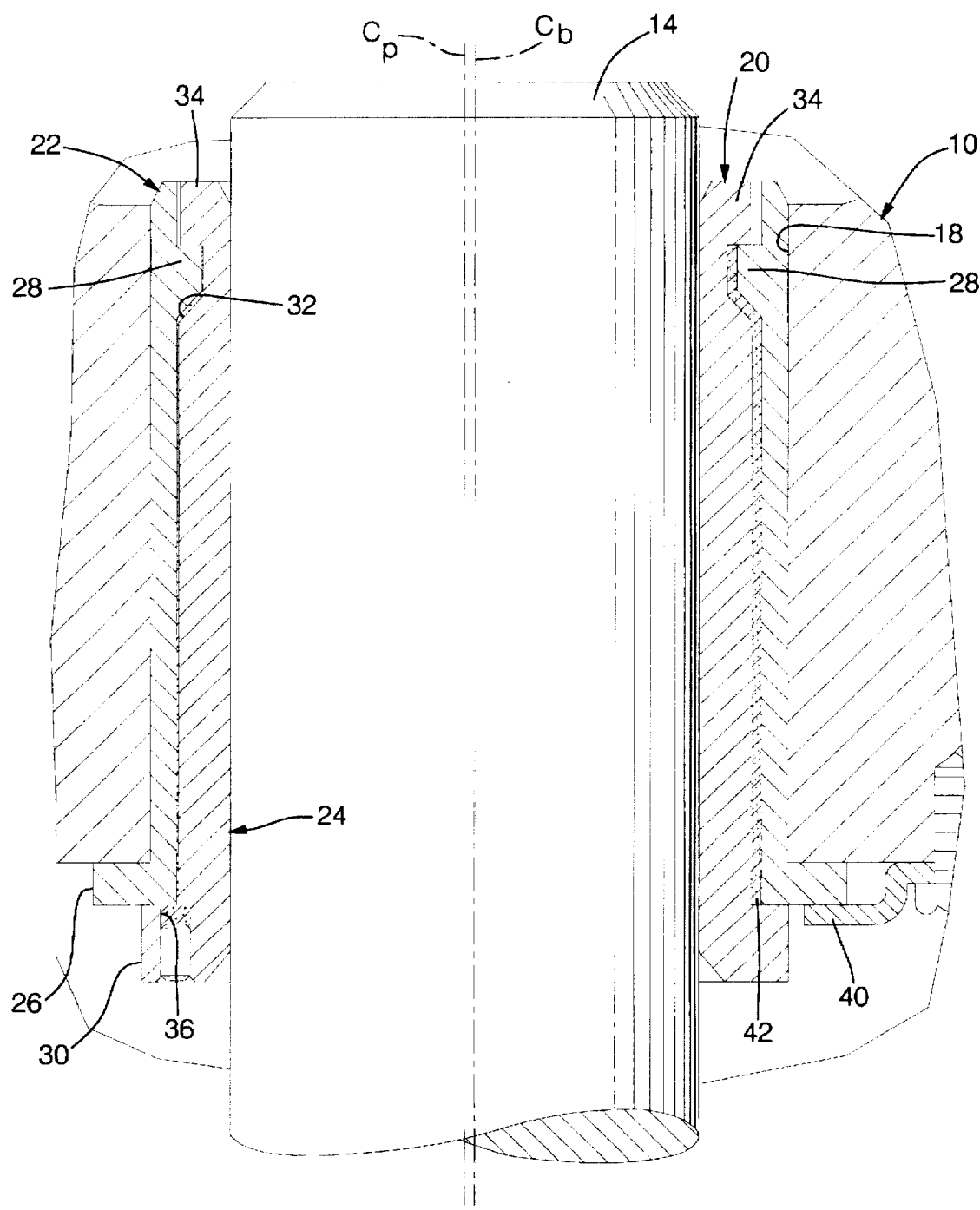
FIG. 7 shows the guide pin inserted axially into the inner sleeve so as to align it with the pin and shift it radially within the outer sleeve, with a hardenable material having been injected into the radial clearance between the two sleeves.

Referring next to FIGS. 6 and 7, the installation and alignment of the assembled bushing 20 is illustrated. Bushing 20 is inserted top end first, axially upwardly into the empty bushing bore 18, with which it makes a close slip fit. The upper surface of the protruding outer sleeve stop flange 26 eventually abuts the flat surface of the upper die 10 surrounding the bore 18. Then, conventional threaded clamps like that shown at 40 are used to clamp against the approximately 15 mm extra radial width of the lower surface of stop flange 26, as best seen in FIG. 6. This is a very significant advantage. That is, the initial installation of the two sleeved bushing 20 is no different than the initial installation of the conventional, one piece bushing. 16. Even more significant, it could be removed and replaced just as easily, if needed. As illustrated, the inner sleeve 24 is shown initially centered within the outer sleeve 22, with an equal radial clearance all the way around, but that would not necessarily be the case, and the sleeves 22 and 24 could well be eccentric to each other. As shown, the inner sleeve 24 is centered on the bore centerline Cb, which is misaligned to the right of the centerline of the guide pin 14, but the misalignment of the inner sleeve 24 could be in any direction. Or, by chance, there could be absolute concentricity between inner sleeve 24 and guide pin 14. The process is not affected by the misalignment, if any, or its direction. After initial installation of the bushing 20, the dies 10 and 12 are closed far enough to insert the guide pin 14 up into the bushing inner sleeve 24, as seen in FIG. 7. There is enough chamfering on the end of pin 14 combined with chamfering on the lower edge of inner sleeve 24 to assure entry of pin 14, even if the inner sleeve 24 and the pin 14 as misaligned by the full tolerance $\Delta$ of 1 mm. The force of pin 14 entering the misaligned inner sleeve 24 forces it radially to the left, or in whatever direction needed to bring pin 14 and inner sleeve 24 coaxial, regardless of the fact that bore 18 and pin 14 are not coaxial. Then, with the pin 14 remaining in inner sleeve 24, a hardenable liquid material, such as epoxy, is injected into the radial clearance between the two sleeves 22 and 24. This forms a layer 42 that eventually hardens, forming a strong bond between the sleeves 22 and 24. The bonding of layer 42 is strengthened by the flutes 38, creating what is, in effect, a solid, one piece bushing 20 within the bore 18. Then, the pin 14 can be backed out, but will be assured of re entering the bushing inner sleeve 24 coaxially every time the dies 10 and 12 are closed thereafter. If and when the inner sleeve 24 wears, the now solid bushing 20 can be easily removed from bore 18 simply by removing the clamps 40, just as would be done with a conventional, one piece bushing 16. A new bushing 20 could be installed, aligned, and set in exactly the same way, with no rework needed for the bushing bore 18 or the pin 14. Even though the part cost of a two piece bushing 20 would be more than a conventional bushing 16, the new process of installing, aligning, and replacing it is projected to save more than enough to justify its extra cost.

Variations in the disclosed embodiment could be made. A different structural feature could be used to axially interlock the two sleeves 22 and 24, but still allow them to shift radially relative to one another to the necessary degree. Fundamentally, what allows the sleeves 22 and 24 to axially interlock, yet still shift relative to one another radially, is the provision of two substantially annular, axially spaced stop surfaces on a first sleeve that are oppositely axially directed to each other (one facing up, one down), and the provision of two substantially annular stop surfaces on the second sleeve that are also oppositely axially directed to each other and also oppositely axially directed to the respective stop surfaces on the first sleeve (one facing down, one up), and which are also axially spaced apart equally to the stop surfaces on the first sleeve (that is, H1 equal to H2). The oppositely axially directed surfaces on the two sleeves also need to radially overlap. If, in addition these oppositely axially directed, radially overlapping stop surfaces are also interfittable (like interrupted teeth or the equivalent), then the two sleeves can be assembled together. When the two sleeves 22 and 24 are also given the necessary minimum internal radial clearance ($\Delta$), then the assembled sleeves will also be able to relatively radially shift as much as needed, but without axially shifting. Many variations of this basic structural framework could be used. For example, instead of the interrupted teeth 34 that can be interfitted with a push and twist, the sleeves could be made interfittable by making one or more of the annular stop surfaces removable. This could be done by threading one end of one sleeve, such as the outside of the upper end of the inner sleeve 24, and threading onto an annular ring onto it and into abutment with an oppositely axially directed, radially overlapping annular ring on the inside of outer sleeve 22, located where the teeth 28 are shown. Likewise, instead of the integral stop flange 30, inner sleeve 24 could be threaded at the lower end, and an annular ring threaded onto it and into abutment with the lower surface of the outer sleeve stop flange 26. The interrupted teeth 28 and 34, and the abutting, non interrupted stop flanges 26 and 30, are particularly advantageous, however. They allow the absolute minimum of component parts (two), and they interfit easily, with just an axial push and relative slight twist. They can be twisted apart, however, while threaded rings could not. The non interrupted nature of the stop flanges 26 and 30 provides a continuous mounting surface for the clamps 40, and closes off the lower end of the internal radial sleeve clearance, but for the port 36. The outer sleeve stop flange 26, especially, serves many purposes, including a stop surface for preventing axial shifting of the sleeves 22 and 24, an abutment to locate the whole bushing 20 when it is installed into bore 18, and a clamping surface for the clamps 40. The inner sleeve 24 need not be provided with the notch 32 above which the teeth 34 protrude, and into which the outer sleeve's teeth 28 protrude. Doing so, however, allows the teeth 34 and 28 to overlap past one another within a minimal total radial thickness of the bushing 20. The total radial thickness of bushing 20 would otherwise have to be greater in order to accommodate both the basic wall thicknesses of the sleeves 22 and 24 and the additional radial thicknesses of the teeth 28 and 34. Also, without the tooth overlap accommodation space provided by the notch 32, the internal radial clearance between the sleeves 22 and 24 would have to be large enough to accommodate the full radial width of the overlapping teeth 28 and 34, plus the necessary radial shifting clearance A. This would still work, but would require a larger bushing bore 18 and much thicker epoxy layer 42. As already noted, the flutes 38 are not absolutely necessary, though very helpful to the interlocking function of the epoxy layer 42. Instead of the axial flutes 38, a spiral groove could be cut into the outer surface of inner sleeve 24. Or, some other roughening could be added to the opposed interior surfaces of either or both sleeves 22 and 24, such as knurling. The outer sleeve 22 could be fixed in the bore 18 by some other, permanent means, such as welding or even epoxy, which would eliminate the need for the removable clamps 40 and the protruding outer sleeve stop flange 26 that the clamps 40 bear against. This might be done in a situation where it was not contemplated that the inner sleeve 24 would ever wear enough to need subsequent replacement. Therefore, it will be understood that it is not intended to limit the invention to just the embodiment disclosed.

I claim:

1. A method of aligning a bushing in a first die with a generally cylindrical die guide pin projecting from a second die, which dies close together and move apart, comprising the steps of, providing a bore in said first die roughly coaxial to said guide pin, within a predetermined radial alignment tolerance, and with sufficient radial clearance between said bore and guide pin to receive a bushing in said bore, providing an outer cylindrical bushing sleeve separate from said first die and secured closely and removably within said bore, providing an inner cylindrical bushing sleeve with an inner diameter sized to closely slidably receive said guide pin and axially fixed within said outer sleeve but radially slidable within said outer sleeve with a radial clearance at least equal to said predetermined bore-guide pin radial alignment tolerance, closing said dies sufficiently to move said guide pin axially into said inner sleeve, thereby radially shifting said inner sleeve within said outer sleeve and into alignment with said guide pin, maintaining said guide pin within said inner sleeve as a hardenable material is injected into the radial clearance between said sleeves, and, moving said dies apart after said hardenable material has set, thereby leaving said inner sleeve in permanent, coaxial alignment with said guide pin.

2. A method of aligning a bushing in a first die with a generally cylindrical die guide pin projecting from a second die, which dies close together and move apart, comprising the steps of, providing a bore in said first die roughly coaxial to said guide pin, within a predetermined radial alignment tolerance, and with sufficient radial clearance between said bore and guide pin to receive a bushing providing an outer cylindrical bushing sleeve separate from said first die with an outer diameter sized to be closely and removably received within said bore and also with a pair of substantially annular, axially spaced, oppositely axially directed stop surfaces, providing an inner cylindrical bushing sleeve with an inner diameter sized to closely slidably receive said guide pin and with an outer diameter having a radial clearance relative to said outer sleeve at least equal to said predetermined radial alignment tolerance, said inner sleeve also having a pair of substantially annular stop surfaces oppositely axially directed both relative to each other and relative to respective stop surfaces on said outer sleeve, said stop surfaces on said inner sleeve also being axially spaced apart equally to said surfaces on said outer sleeve, radially overlapping with said surfaces on said outer sleeve and interfittable with said surfaces on said outer sleeve, inserting said inner sleeve axially within said outer sleeve until said respective stop surfaces axially abut and radially overlap, securing said outer sleeve within said bore, so as to place said inner sleeve within said bore, closing said dies sufficiently to move said guide pin axially into said inner sleeve, thereby radially shifting said inner sleeve within said outer sleeve and into coaxial alignment with said guide pin, maintaining said guide pin within said inner sleeve as a hardenable material is injected into the radial clearance between said sleeves, and, moving said dies apart after said hardenable material has set,,thereby leaving said inner sleeve in permanent, coaxial alignment with said guide pin.

3. A method of aligning a bushing in a first die with a generally cylindrical die guide pin projecting from a second die, which dies close together and move apart, comprising the steps of, providing a bore in said first die roughly coaxial to said guide pin, within a predetermined radial alignment tolerance, and with sufficient radial clearance between said bore and guide pin to receive a bushing, providing an outer cylindrical bushing sleeve separate from said first die with an outer diameter sized to be closely and removably received within said bore and also with a pair of substantially annular, axially spaced, oppositely axially directed stop surfaces one, of said stop surfaces being located at one end of said outer sleeve and protruding past the outer diameter of said outer sleeve, providing an inner cylindrical bushing sleeve with an inner diameter sized to closely slidably receive said guide pin and with an outer diameter having a radial clearance relative to said outer sleeve at least equal to said predetermined radial alignment tolerance, said inner sleeve also having a pair of substantially annular stop surfaces oppositely axially directed both relative to each other and relative to respective stop surfaces on said outer sleeve, said stop surfaces on said inner sleeve also being axially spaced apart equally to said on said outer sleeve surfaces, radially overlapping with said surfaces on said outer sleeve, and interfittable with said surfaces on said outer sleeve, inserting said inner sleeve axially within said outer sleeve until said respective stop surfaces axially abut and radially overlap, inserting said outer sleeve axially into said bore until said one annular stop surface abuts said first die, removably securing said one outer sleeve stop surface to said first die to thereby removably secure said bushing within said bore and thereby locate said inner sleeve within said bore, closing said dies sufficiently to move said guide pin axially into said inner sleeve, thereby radially shifting said inner sleeve within said outer sleeve and into coaxial alignment with said guide pin, maintaining said guide pin within said inner sleeve as a hardenable material is injected into the radial clearance between said sleeves, and, moving said dies apart after said hardenable material has set, thereby leaving said inner sleeve in permanent, coaxial alignment with said guide pin.

* * * * *